United States Patent
Dunnigan

(10) Patent No.: US 10,103,836 B2
(45) Date of Patent: *Oct. 16, 2018

(54) THREAT RESPONSE SIGNAL INHIBITING APPARATUS FOR RADIO FREQUENCY CONTROLLED DEVICES AND CORRESPONDING METHODS

(71) Applicant: Timothy Patrick Dunnigan, Columbus, GA (US)

(72) Inventor: Timothy Patrick Dunnigan, Columbus, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,853

(22) Filed: Mar. 13, 2017

(65) Prior Publication Data

US 2017/0187485 A1 Jun. 29, 2017

Related U.S. Application Data

(63) Continuation of application No. 14/713,986, filed on May 15, 2015, now Pat. No. 9,716,566, which is a (Continued)

(51) Int. Cl.
*H04K 3/00* (2006.01)
*A01K 27/00* (2006.01)
(Continued)

(52) U.S. Cl.
CPC .............. *H04K 3/92* (2013.01); *A01K 27/002* (2013.01); *A01K 27/003* (2013.01);
(Continued)

(58) Field of Classification Search
CPC ........ H04K 2203/24; H04K 3/92; H04K 3/42; H04K 2203/16; H04K 3/44; H04K 3/45;
(Continued)

(56) References Cited

U.S. PATENT DOCUMENTS 3,910,457 A 10/1975 Sutliff et al.
4,044,478 A 8/1977 Girard
(Continued)

FOREIGN PATENT DOCUMENTS

DE 20 2011 002146 5/2011
GB 2458143 9/2009

OTHER PUBLICATIONS

Menier, Renan , "PCT Search Report and Written Opinion", PCT/US2015/010406; Filed Jan. 7, 2015; dated Sep. 21, 2015.
(Continued)

*Primary Examiner* — Golam Sorowar
(74) *Attorney, Agent, or Firm* — Philip H. Burrus, IV

(57) ABSTRACT

An apparatus (100) includes a canine harness (101) with a radio frequency inhibitor (400). A leash (1002) can serve as a control device (102). The leash can selectively mechanically couple to the canine harness and electrically couple an actuator (114) to the radio frequency inhibitor. When the actuator is actuated, the radio frequency inhibitor is to emit one or more radio frequency inhibition signals (405), which can include the emission of all programmed signals simultaneously. Radio frequency inhibitors can also be integrated into clothing or armor (1802), as well as equipment (1901). The radio frequency inhibitor can interrupt, suppress, or halt electronic detonation communications to an explosive device.

18 Claims, 15 Drawing Sheets

Related U.S. Application Data continuation of application No. 14/530,793, filed on Nov. 2, 2014, now Pat. No. 9,071,387.

(60) Provisional application No. 61/924,725, filed on Jan. 8, 2014.

(51) Int. Cl.
*F42D 5/04* (2006.01)
*F42C 15/44* (2006.01)
*F41H 11/132* (2011.01)

(52) U.S. Cl.
CPC .......... *A01K 27/005* (2013.01); *A01K 27/009* (2013.01); *F41H 11/132* (2013.01); *F42C 15/44* (2013.01); *F42D 5/04* (2013.01); *H04K 3/41* (2013.01); *H04K 3/42* (2013.01); *H04K 3/43* (2013.01); *H04K 2203/24* (2013.01)

(58) Field of Classification Search
CPC .. H04K 2203/34; H04K 2203/32; H04K 3/43; H04K 3/65; H04K 3/94; H04K 3/41; H04K 3/68; H04K 3/60; H04K 3/228; H04K 3/25; H04K 3/28; H04K 3/827; F41H 11/12; F41H 11/32; F41H 13/0043; F41H 11/16; F41H 11/30; F41H 13/0062; A01K 27/009; A01K 15/02; A01K 15/029; A01K 29/00; A01K 11/006
See application file for complete search history.

(56) References Cited

U.S. PATENT DOCUMENTS

| | | | |
|---|---|---|---|
| 4,651,204 A | 3/1987 | Uemura | |
| 6,047,664 A | 4/2000 | Lyerly | |
| 6,112,052 A | 8/2000 | Guthrie | |
| 6,955,138 B2* | 10/2005 | DeBien | A01K 27/005 119/718 |
| 7,982,654 B2 | 7/2011 | Low | |
| 8,055,276 B2* | 11/2011 | Otto | H04K 3/226 340/539.1 |
| 8,224,234 B1 | 7/2012 | Schuster et al. | |
| 8,499,362 B2 | 8/2013 | Dennis | |
| 8,543,053 B1 | 9/2013 | Melamed et al. | |
| 8,638,681 B2 | 1/2014 | Richardson et al. | |
| 2004/0143437 A1 | 7/2004 | Hanood | |
| 2006/0213455 A1 | 9/2006 | Bien | |
| 2009/0002249 A1* | 1/2009 | Bloss | H01Q 3/08 343/758 |
| 2009/0140921 A1* | 6/2009 | Bongfeldt | H01Q 1/1242 342/372 |
| 2010/0199927 A1 | 8/2010 | Cigard et al. | |
| 2011/0183602 A1 | 7/2011 | Tietz | |
| 2012/0242501 A1* | 9/2012 | Tran | A61B 5/0024 340/870.02 |
| 2014/0035783 A1 | 2/2014 | Contarino et al. | |
| 2014/0206279 A1 | 7/2014 | Immendorf et al. | |

OTHER PUBLICATIONS

Sorowar, Golam, "Final OA", U.S. Appl. No. 14/530,793, filed Nov. 2, 2014; dated Apr. 14, 2015.
Sorowar, Golam, "Non Final OA", U.S. Appl. No. 14/530,793, filed Nov. 2, 2014; dated Apr. 14, 2015.
Sorowar, Golam, "NonFinal OA", U.S. Appl. No. 14/713,986, filed May 15, 2015; dated May 20, 2016.
Sorowar, Golam, "Notice of Allowance", U.S. Appl. No. 14/713,986, filed May 15, 2015; dated Nov. 8, 2016.
Sorowar, Golam, "Notice of Allowance", U.S. Appl. No. 14/530,793, filed Nov. 2, 2014; dated Apr. 17, 2015.

* cited by examiner

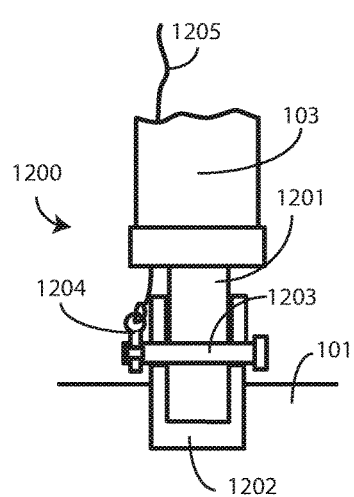 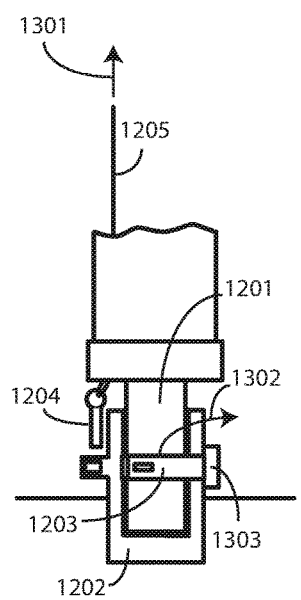 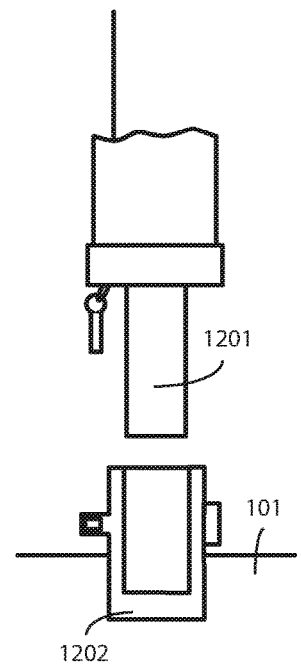
*FIG. 12*  *FIG. 13*  *FIG. 14*

# THREAT RESPONSE SIGNAL INHIBITING APPARATUS FOR RADIO FREQUENCY CONTROLLED DEVICES AND CORRESPONDING METHODS

CROSS REFERENCE TO PRIOR APPLICATIONS

This application is a continuation application of U.S. Ser. No. 14/713,986, filed May 15, 2015, which is continuation of U.S. Ser. No. 14/530,793, filed Nov. 2, 2014, which claims priority and benefit under 35 U.S.C. § 119(e) from U.S. Provisional Application No. 61/924,725, filed Jan. 8, 2014, each of which is incorporated by reference for all purposes.

BACKGROUND

Technical Field

This disclosure relates generally to electronic devices, and more particularly to electronic signal inhibition devices and methods.

Background Art

Location and detection of explosives has become high priority among law enforcement and military personnel. In the wake of international and domestic terrorist attacks using industrial and improvised explosives, the success of explosive device location and detection techniques directly correlates to the number of lives saved. When law enforcement or military personnel are successfully able to locate and neutralize an explosive device prior to detonation, the tools of terrorism are rendered ineffective to kill or maim.

While some electronic location and detection techniques have been attempted, one of the most successful explosive detection devices is that of a canine's nose. Canines have been used by military and law enforcement personnel alike to detect the scent of explosive materials. For instance, a handler may lead a trained canine to specific locations, packages, containers, luggage, or other items so that the canine can search for scents of explosives. The handler directs the search and the canine provides the detection capability. When the canine detects an explosive, it notifies its handler through a behavioral change such as sitting. The handler then is able to call in an explosive neutralization team to, hopefully, render the explosive inoperable prior to detonation. The handler may also clear an area of bystanders in an effort to prevent injury or death.

Although many explosives are detected with the use of canines, the process of neutralization is imperfect. When notified by a canine that an explosive has been detected, the handler must call in additional personnel, such as an explosive ordinance disposal team, to neutralize the explosive. This need to request additional personnel causes unnecessary disadvantages. For instance, it takes time for the additional personnel to arrive and neutralize the explosive. The explosive could be detonated in this time. Moreover, the handler, the canine, and any bystanders are at increased risk during this time. It would be advantageous to have an improved apparatus and method for neutralizing explosive devices to prevent their detonation.

BRIEF DESCRIPTION OF THE DRAWINGS

FIGS. 12-14 illustrate one explanatory quick release mechanism in accordance with one or more embodiments of the disclosure.

Figure 1:
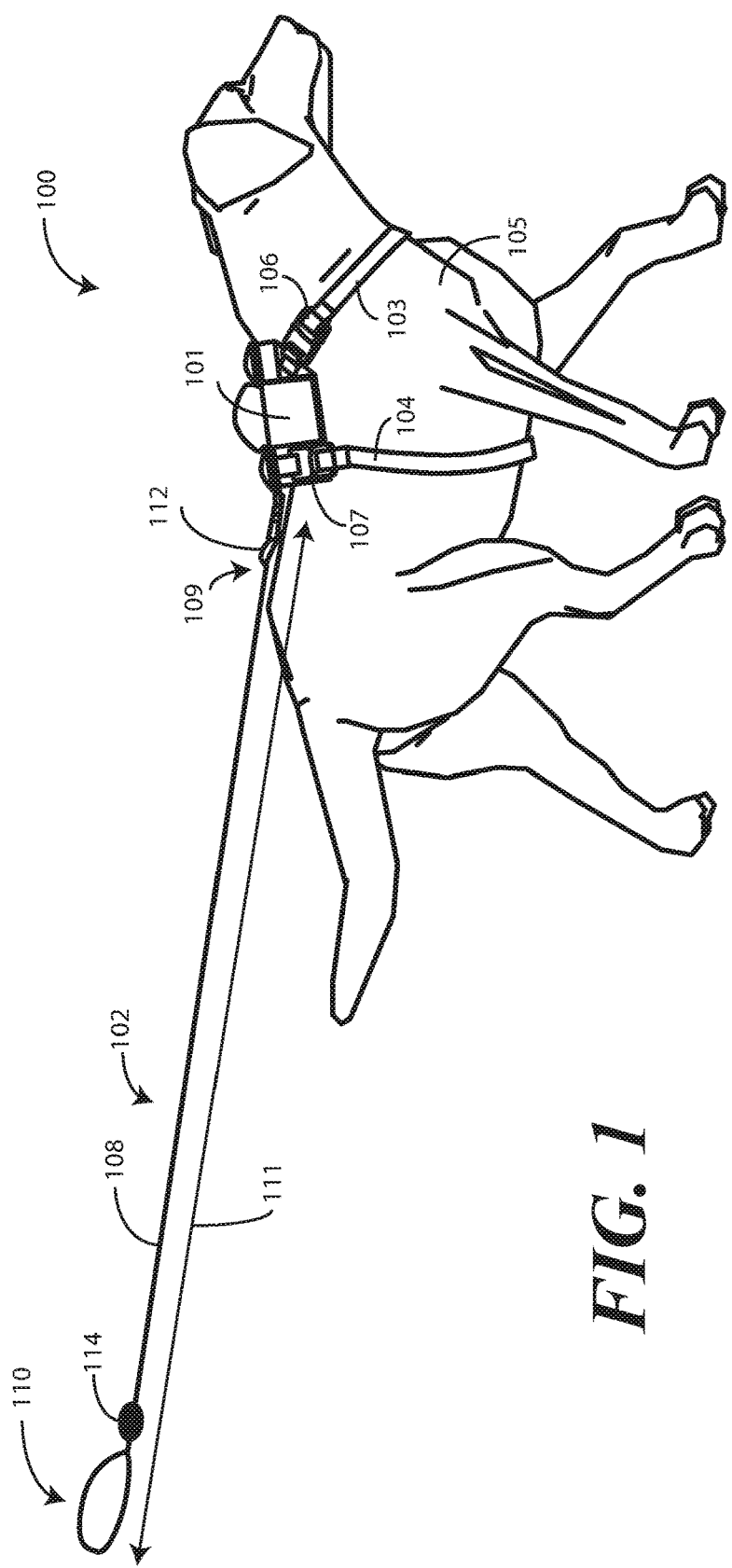
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to signal inhibition devices, some of which are wearable by humans, and that are capable of interrupting, suppressing, or halting electronic detonation communications to an explosive device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of signal inhibition from a wearable or other device as described herein. The non-processor circuits may include, but are not limited to, a radio transmitter, signal drivers, clock circuits, power source circuits, and user input devices. As such, these functions may be interpreted as steps of a method to perform signal inhibition from a wearable or other device to prevent the detonation of radio frequency controlled explosive devices, be they improvised, industrial, or other. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a signal inhibitor that can be worn in one or more embodiments, by a canine or person, that provides an immediate threat response system for radio frequency controlled explosive devices. Embodiments of the disclosure can impede, degrade, interrupt, or prevent remote explosive detonation signal transmissions. Embodiments of the disclosure provide apparatuses and methods to respond to immediately explosive threats, be they body-worn, hand-carried, static, or other. Embodiments of the disclosure can further disrupt remote explosive detonation signals without additional personnel or equipment. Most importantly, embodiments of the disclosure reduce the amount of time that passes between explosive detection and neutralization, thereby saving lives.

Embodiments of the disclosure contemplate that empirical evidence suggests that properly trained canines are the superior explosive material detection tools. Canine mobility, experience, and a 240 million-scent cell olfactory system are the foundations of the evidence. In one embodiment, a canine harness is equipped with a radio frequency inhibitor configured to selectively emit radio frequency inhibition signals to interfere with the operation of radio frequency control devices operating within a radio frequency neutralization radius defined by the radio frequency inhibition signals. A control unit, which is configured as a leash in one or more embodiments, includes an actuator to cause the radio frequency inhibitor to emit the one or more radio frequency inhibition signals when the actuator is actuated by a user. The term "selectively" is used to refer to the fact that a user can select whether to cause the emission of the radio frequency inhibition signals via actuation of the actuator or otherwise.

In one or more embodiments, the radio frequency inhibitor comprises a directional antennal to emit the radio frequency inhibition signals as a lobed radio frequency inhibition signal output about the canine harness. In one or more embodiments, the output power selected for radio frequency inhibition signal output is such that interference with the operation of radio frequency control devices occurs within a radio frequency neutralization radius defined by the radio frequency inhibition signals. In one or more embodiments, this radio frequency neutralization radius is less than a length of the control device. For example, if the control device is a leash with a length of about ten feet, the radio frequency neutralization radius can be less than ten feet in one or more embodiments.

The combination of the lobed radio frequency inhibition signal output and the limited radio frequency neutralization radius offers several advantages. First, it allows the radio frequency inhibitor to operate at a lower output power. For example, in one or more embodiments lobed radio frequency inhibition signal output has an output power less than or equal to minus eighty-five decibel-milliwatts and inhibits, impedes, interferes with, or halts the operation of radio frequency controlled devices operating within a ten foot radius of the canine harness. This reduction in power allows for longer battery life and less heat generation, which is important when the radio frequency inhibitor is worn close to a canine's coat. Second, where the radio frequency neutralization radius is less than the length of the leash, a handler can still operate radio frequency devices to call support, tactical backup, or other personnel.

In one or more embodiments, when a canine finds an explosive or other dangerous radio frequency controlled devices, the handler can use the actuator to cause the radio frequency inhibitor to inhibit, impede, interfere with, or halt the transmission of radio frequency signals within the radio frequency neutralization radius. Accordingly, an adversary with, for example, a cell phone intending to detonate an improvised explosive would be unable to do so. Advantageously, embodiments of the disclosure can neutralize explosives such as those used in the Boston Marathon bombing that are detonated remotely by radio frequency devices. In one or more embodiments, to protect the canine and the handler, the canine harness can be removed from the dog and left in an active mode near the dangerous radio controlled device. The canine can then be removed from the radio frequency neutralization radius for safety. In one or more embodiments, the canine harness comprises one or more attachment devices to attach the canine harness to a canine. The control device can then include a quick release mechanism to selectively release the canine harness from the canine. In one or more embodiments, this can occur without requiring the handler to enter the radio frequency neutralization radius.

As described below, one or more embodiments of the disclosure provide an immediate threat response that can prevent remote explosive detonation radio frequency signal transmissions. In one or more embodiments, the device can be worn by explosives detection canines and can be activated by the canine's handler using an actuator disposed at an end of the leash distally located from the canine harness. Advantageously, embodiments of the disclosure offer remote explosive detonation prevention capabilities enable trained personnel to respond to explosive threats immediately, disrupt remote explosive detonation signals without additional personnel or equipment, and save lives. Other benefits, uses, and features of embodiments of the disclosure will be obvious to those of ordinary skill in the art having the benefit of this disclosure.

Turning now to FIG. 1, illustrated therein is one apparatus 100 configured in accordance with one or more embodiments of the disclosure. In this example, the apparatus 100 includes a canine harness 101. In one embodiment, the canine harness 101 includes one or more attachment devices 103,104 to attach the canine harness 101 to a canine 105.

In this illustrative embodiment, the attachment devices 103,104 comprise nylon straps that attach to the canine harness 101 via one or more buckles 106,107. A first attachment device 103 fastens about the canine's chest. A second attachment device 104 fastens about the canine's stomach or belly. Other forms of attachment devices 103, 104 will be obvious to those of ordinary skill in the art having the benefit of this disclosure. For example, in another embodiment the nylon straps may be replaced with a chest harness that spans the chest of the canine 105.

In this illustrative embodiment, the canine harness 101 is a unitary device worn generally on the canine's back. However, embodiments of the disclosure are not so limited. For example, in another embodiment the canine harness 101 could be divided into two parts, with a first portion worn on the canine's left side and another portion worn on the canine's right side. In another embodiment, the canine harness 101 could be worn on the canine's chest as well. Other configurations will be obvious to those of ordinary skill in the art having the benefit of this disclosure.

In one embodiment, the canine harness 101 is manufactured from a lightweight, water resistant material such as nylon. Mesh pockets can be disposed along major faces of the canine harness 101. In one embodiment, when fully loaded with a radio frequency inhibitor and corresponding electronic components, the canine harness 101 weights approximately less than one pound. In one embodiment, the canine harness 101 has dimensions of about nine inches by seven inches by one and a half inches.

The apparatus 100 also includes a control device 102. In this embodiment, the control device 102 is configured to function as both a mechanical control for the canine 105 and an electronic control for electronics disposed within the canine harness 101. It should be noted that the mechanical control functionality of the control device 102 is optional. In other embodiments described below, for example, an apparatus configured in accordance with one or more embodiments of the disclosure can be worn in a garment such as a vest on a person. In such an embodiment, mechanical control may not be necessary. Accordingly, in one or more embodiments the control device 102 comprises an electrical control only.

In this embodiment, the control device 102 is configured as a leash 108. To provide both mechanical control for the canine 105 and electrical control of one or more circuit components disposed within the canine harness 101, the leash 108 is both electrically and mechanically coupled to the canine harness 101 in this embodiment.

The leash 108 includes a first end 109 and a second end 110. The second end 110 is distally located from the first end 109 along a length 111 of the leash 108. In one embodiment, the length 111 of the leash is about ten feet. The term "about" as used herein refers to a dimension inclusive of manufacturing tolerances. Thus, leash 108 having a length 111 of ten feet plus or minus two inches would be considered to be "about" ten feet even if it was, for example, nine feet and eleven inches or ten feet and one and one half inches.

In this embodiment, the first end 109 is selectively attachable to the canine harness 101. Accordingly, a user can attach the first end 109 of the leash 108 to a coupler 112 on the canine harness 101 when desired, and can also detach the first end 109 of the leash 108 when the leash 108 is not in use. This will be shown in more detail with reference to FIGS. 8 and 12 below.

As will be described in more detail below, in one embodiment the canine harness 101 includes a radio frequency inhibitor. The radio frequency inhibitor is an electronic circuit capable of emitting interfering radio frequency signals that prevent or degrade radio frequency communication between devices within proximity of the canine harness 101. Advantageously, the radio frequency inhibitor can be used to prevent unauthorized or threatening radio frequency communications between devices operated by terrorists or enemy combatants.

In this embodiment, the second end 110 of the leash 108 comprises an actuator 114 that is electrically coupled to the radio frequency inhibitor. The actuator 114 can take a number of forms. In one embodiment, the actuator 114 is a push button switch. In another embodiment, the actuator 114 is a toggle switch. In yet another embodiment, the actuator is a touch sensitive surface. Other forms of actuators suitable for use with embodiments of the disclosure will be obvious to those of ordinary skill in the art having the benefit of this disclosure.

In one embodiment, the actuator 114 is electrically coupled to the radio frequency inhibitor when the first end 109 of the leash 108 is coupled to the canine harness 101. Accordingly, a user can actuate the actuator 114 to cause the radio frequency inhibitor to emit one or more radio frequency inhibition signals.

Embodiments of the disclosure contemplate that explosive detection canine operations have a capability gap in mitigating and/or preventing the remote detonation of explosive devices, be they industrial, homemade, or improvised. Embodiments of the disclosure contemplate that terrorists and other combatants frequently use radio frequency devices to detonate such explosives. By emitting one or more radio frequency inhibition signals, the radio frequency inhibitor can advantageously preclude the detonation signals from successfully reaching an explosive device proximately located with the canine harness 101. Accordingly, when the canine 105 finds an explosive, it can notify its handler. The handler can then actuate the actuator 114 to prevent or degrade radio frequency communication between a detonator and an explosive device. Embodiments of the disclosure can be used to neutralize explosive devices that are in any form, including those that are hand-carried, body-worn, or static package explosive threats. Embodiments of the disclosure thus provide an explosive prevention device that disrupts remote detonation frequencies within a predetermined neutralization radius.

Use of the radio frequency inhibitor provides a unique radio frequency inhibitor that is integrated into a canine harness 101, with control therefore provided by an actuator 114 disposed in a leash 108. Embodiments of the disclosure contemplate that a properly trained canine 105 provides a superior tool for finding explosive materials. The radio frequency inhibitor mitigates and/or prevents the detonation of explosive devices that use radio frequency remote initiation. Radio frequency inhibitors configured in embodiments of the disclosure can provide simultaneous, full-spectrum multifrequency radio signal inhibition.

Figure 2:
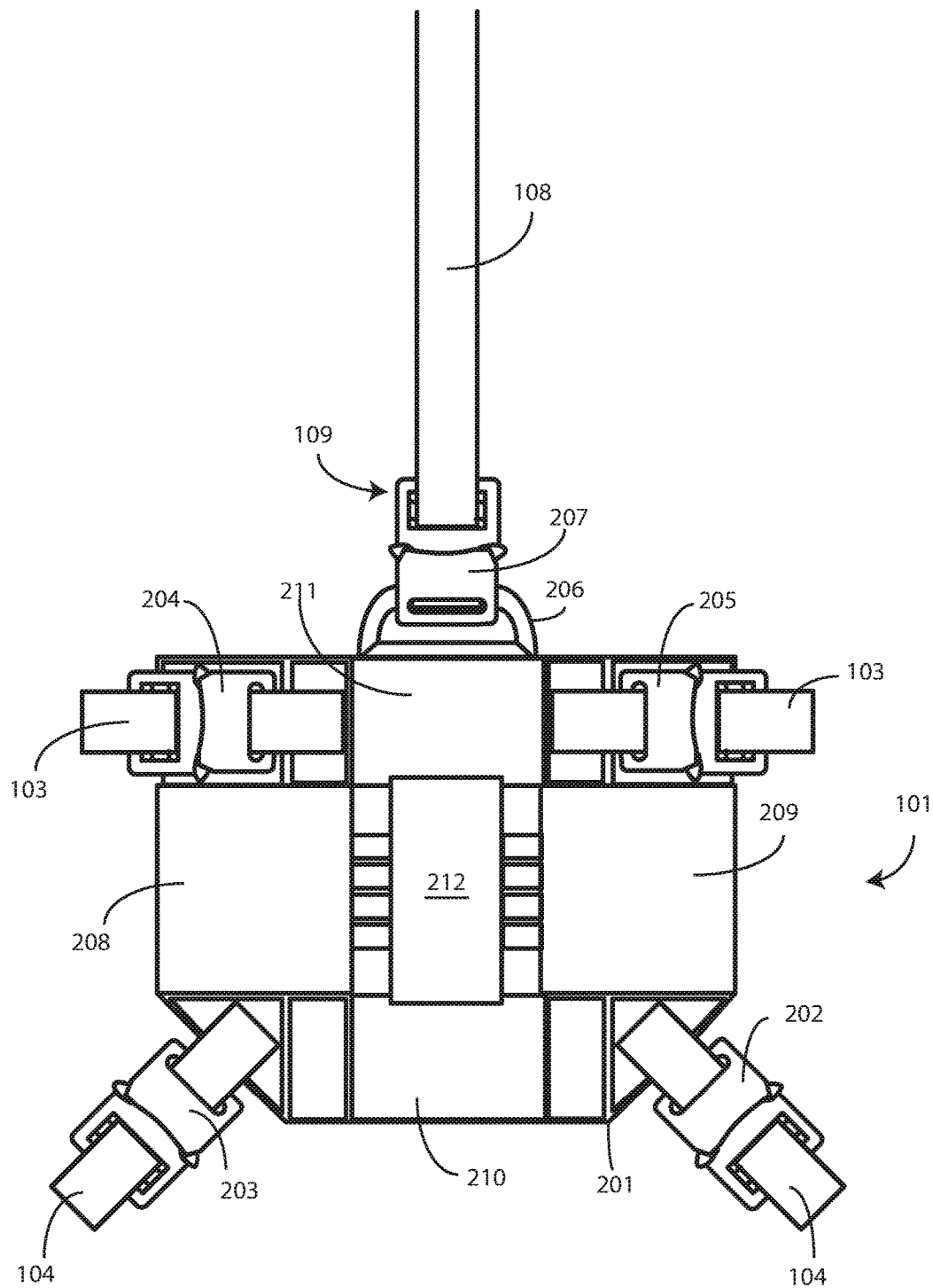
FIG. 2 illustrates one explanatory apparatus in accordance with one or more embodiments of the disclosure.

Turning now to FIG. 2, illustrated therein is a top plan view of one embodiment of a canine harness 101 configured in accordance with one or more embodiments of the disclosure. The canine harness 101 includes a base layer 201 of material to which various components can be attached. For example, in this embodiment the attachment devices 103, 104 are selectively attachable to the canine harness 101 by way of one or more releasable buckles 202,203,204,205. As will be described in more detail with reference to FIG. 12 below, in one or more embodiments the one or more releasable buckles 202,203,204,205 can be configured with quick release devices so that a handler can release the canine harness 101 from the canine (105) with a quick release control device disposed at the second end (110) of the leash 108. As shown in FIG. 2, in one embodiment the first end 109 of the leash 108 is selectively attachable to a mechanical coupler 206 attached to the canine harness 101 by way of a releasable buckle 207.

In this illustrative embodiment, one or more pockets 208,209,210,211 are disposed along the base layer 201 of the canine harness 101. Electrical components, including printed circuit boards, antennas, power sources, batteries, and so forth, may be disposed within these pockets 208,209, 210,211 in one or more embodiments. In this illustrative embodiment, the antenna of the radio frequency inhibitor is disposed in a crown pocket 212 disposed centrally along the base layer 201 of the canine harness 101.

Figure 3:
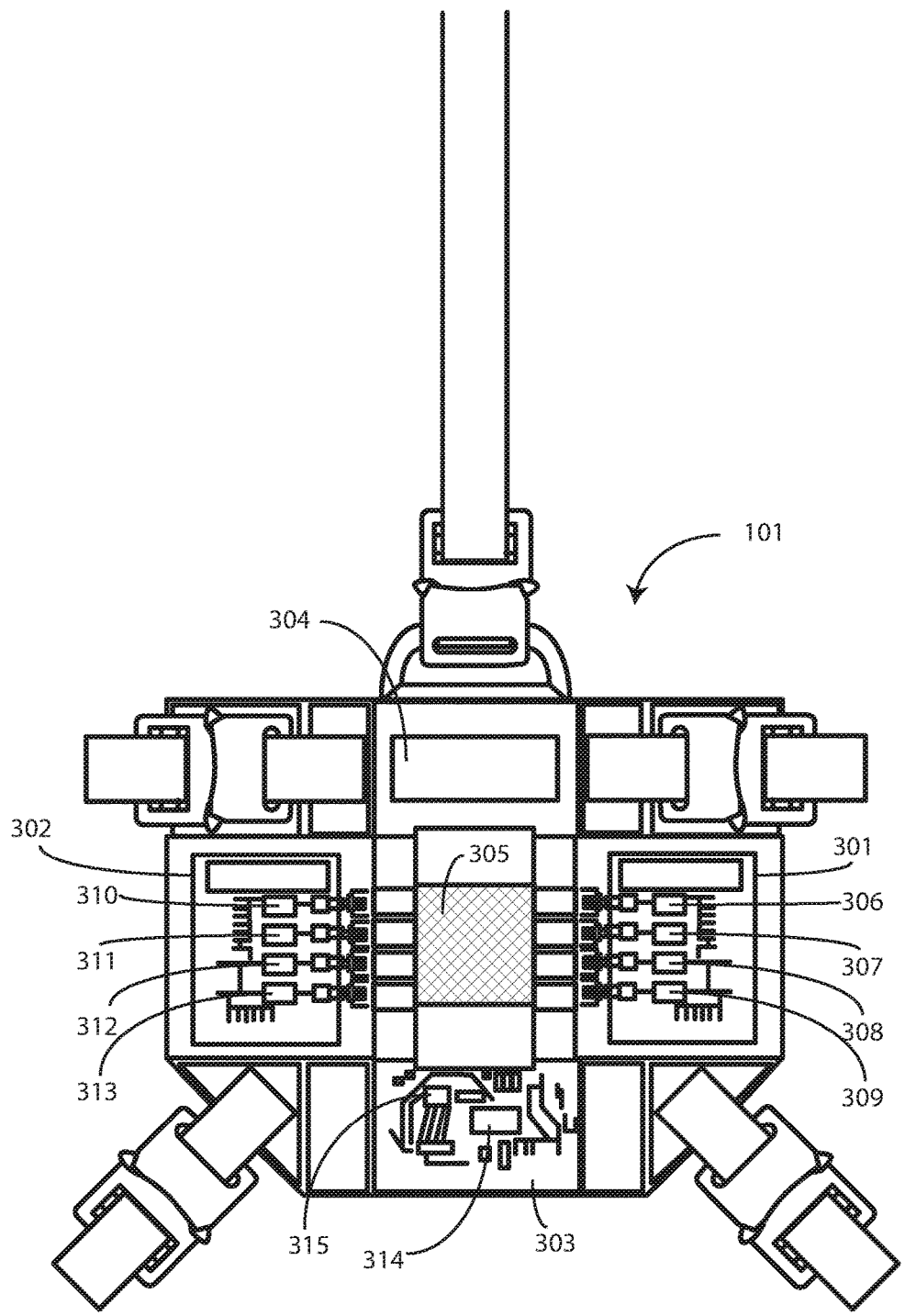
FIG. 3 illustrates one explanatory apparatus in accordance with one or more embodiments of the disclosure.

Turning now to FIG. 3, illustrated therein is another plan view of the canine harness 101 showing components disposed within the one or more pockets (208,209,210,211). In this illustrative embodiment, a radio frequency inhibitor includes a first printed circuit board 301, a second printed circuit board 302, a third printed circuit board 303, a rechargeable battery 304, and an antenna assembly 305.

While more details of the radio frequency inhibitor are shown below with reference to FIGS. 4 and 5, in this embodiment the first printed circuit board 301 comprises a first radio frequency circuit board comprising one or more radio frequency circuits 306,307,308,309 operating in one or more frequency bands. A main objective for the canine harness 101 and its radio frequency inhibitor can be for the radio frequency circuits 306,307,308,309 to output a multiple frequency band inhibitor across one or more bands. These frequency bands can correspond to wireless communication protocols that may be used by a terrorist or other threat to detonate an explosive device with wireless communication signals.

Such band can include those associated with wireless communication with one or more other devices or networks. The bands can correspond to those used by wide area networks, local area networks, and/or personal area networks. Examples include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The bands can also be those used in peer-to-peer or ad hoc communications such as HomeRF, Bluetooth and IEEE 802.11 (a, b, g or n); and other forms of wireless communication.

Illustrating by example, in one embodiment, a first band is between about three hundred megahertz to about five hundred megahertz. A second band is between about seven hundred twenty-five megahertz to about seven hundred eighty-five megahertz. A third band is between about eight hundred fifty megahertz to about nine hundred megahertz. A fourth band is between about nine hundred twenty-five megahertz to about nine hundred sixty megahertz. Of course, combinations of these bands can be used as well. These bands are illustrative only, as others will be obvious to those of ordinary skill in the art having the benefit of this disclosure.

Similarly, in this embodiment the second printed circuit board 302 comprises a second radio frequency circuit board comprising one or more radio frequency circuits 310,311, 312,313 operating within one or more frequency bands. A first band can be between about eighteen hundred megahertz to about eighteen hundred eighty megahertz, while a second band is between about nineteen hundred thirty megahertz to about nineteen hundred ninety megahertz. A third band can be between about twenty-one hundred megahertz to about twenty-one hundred eighty-five megahertz, while a fourth band can be between about twenty-three hundred twenty-five megahertz to about twenty-four hundred megahertz. Again, combinations of these bands can be used. Other bands will be obvious to those of ordinary skill in the art having the benefit of this disclosure.

In this embodiment, the third printed circuit board 303 is a control board, and houses a control circuit 314, one or more memory devices 315, and other corresponding circuits. The control circuit 314 can be used to control the one or more radio frequency circuits 306,307,308,309 and can allow a user to select which of the frequency bands should be emitted by the radio frequency boards.

In one embodiment, the control circuit 314 can include one or more processors, such as a microprocessor, a group of processing components, one or more Application Specific Integrated Circuits (ASICs), programmable logic, or other type of processing device. The control circuit can be operable with the one or more radio frequency circuits 306,307, 308,309 via a bus (not shown) that couples the first printed circuit board 301, second printed circuit board 302, and third printed circuit board 303. The control circuit 314 can be configured to process and execute executable software code to perform the various functions of the apparatus (100). A storage device, such as memory 315, can optionally store the executable software code used by the control circuit 314 during operation. In one embodiment, the control circuit 314 executes this software or firmware, in part, to provide device functionality. The memory 315 may include either or both static and dynamic memory components, may be used for storing both embedded code and user data.

In this illustrative embodiment, each of the radio frequency circuits 306,307,308,309, 310,311,312,313 are operable with an antenna assembly 305. In one embodiment, the antenna assembly 305 comprises a flexible fabric or film antenna manufactured from a polymeric thick film comprising a conductive powder that can be silver, copper, graphite, or combinations thereof. Other types of antenna assemblies will be obvious to those of ordinary skill in the art having the benefit of this disclosure.

Figure 4:
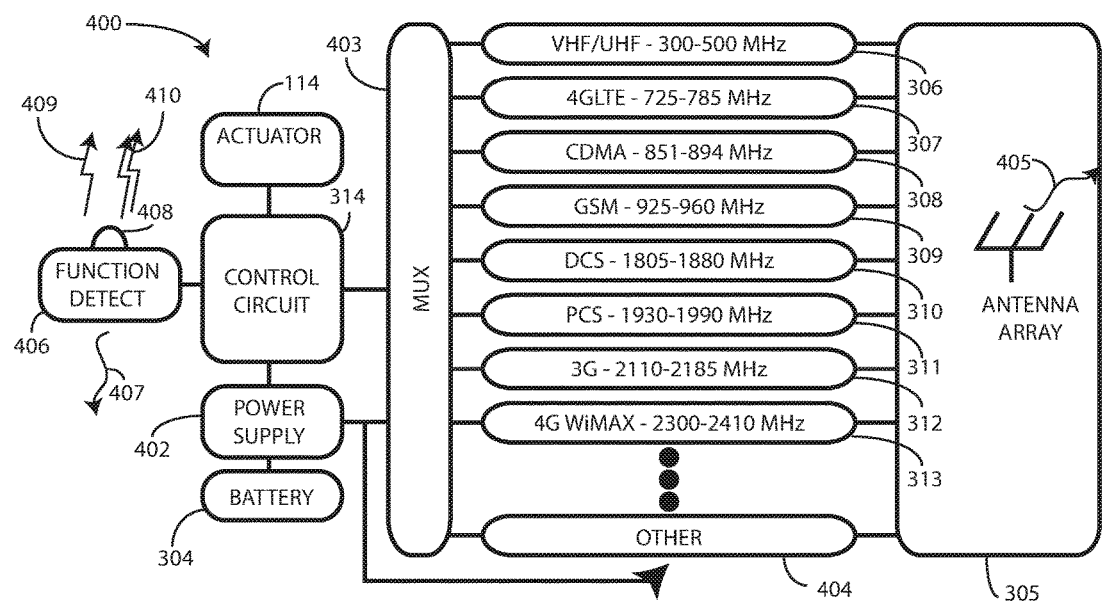
FIG. 4 illustrates one explanatory radio frequency inhibitor in accordance with one or more embodiments of the disclosure.

Turning now to FIG. 4, illustrated therein is a schematic block diagram of one explanatory radio frequency inhibitor 400 in accordance with one or more embodiments of the disclosure. The radio frequency inhibitor 400 is suitable for incorporation into a canine harness 101 as previously described.

As mentioned above with reference to FIG. 3, in one embodiment the radio frequency inhibitor 400 includes a control circuit 314, one or more radio frequency circuits 401 operating within one or more frequency bands and that is operable with the control circuit 314, and an antenna assembly 305. Also shown in FIG. 4 are a power supply 402, the rechargeable battery 304, and multiplexing circuitry 403 with which the control circuit 314 can selectively control the one or more radio frequency circuits 401. In one or more embodiments, the power supply 402 can include a switch that allows the radio frequency inhibitor 400 to be activated for "off-leash operations."

In this illustrative embodiment, the one or more radio frequency circuits 401 include the eight radio frequency circuits 306,307,308,309,310,311,312,313 of FIG. 3. However, fewer or more radio frequency circuits could be used in certain applications. For example, in other embodiments the eight radio frequency circuits 306,307,308,309,310,311, 312,313 may be combined into a single radio frequency circuit with a selective tuner. In other embodiments, a subset of the eight radio frequency circuits 306,307,308,309,310, 311,312,313 can be used to target a specific frequency band. In still other embodiments, additional radio frequency circuits 404 could be added to the array as well. The use of eight radio frequency circuits 306,307,308, 309,310,311, 312,313 in the parallel configuration of FIG. 4 advantageously allows the emission of one or more radio frequency inhibition signals 405 in multiple frequency bands simultaneously.

Illustrating by example, in one embodiment the radio frequency inhibitor 401 is designed to emit one or more radio frequency inhibition signals 405 within specific frequency bands that are likely to be used by enemy combatants to detonate explosive devices. In one embodiment, these frequencies include the following bands: the VHF/UHF band, which is about 300-500 MHz, the 4G LTE band, which is about 725-785 MHz, the CDMA band, which is about 851-894 MHz, the GSM band, which is about 925-960 MHz, the DCS band, which is about 1805-1880 MHz, the PCS band, which is about 1930-1990 MHz, the 3G band, which is about 2110-2185 MHz, and the 4G WiMax band, which is about 2300-2410 MHz. Accordingly, radio frequency circuit 306 may be configured to operate in the VHF/UHF band, while radio frequency circuit 307 may be configured to operate in the 4G LTE band. Similarly, radio frequency circuit 308 may be configured to operate in the CDMA band, while radio frequency circuit 309 operates in the GSM band. Radio frequency circuit 310 may operate in the DCS band, while radio frequency circuit 311 operates in the PCS band. Radio frequency circuit 312 can operate in the 3G band, while radio frequency circuit 313 operates in the 4G WiMax band. Other frequency bands may be selected for other applications, and will be obvious to those of ordinary skill in the art having the benefit of this disclosure.

The bands mentioned above were selected for one embodiment by experimental testing using a simulated smart phone as a detonation agent. As the simulated smart phone swept through multiple bands and frequencies to find service, emission of radio frequency inhibition signals 405 in these ranges precluded all connections with service providers, be they operating 4G LTE networks, all protocols from LTE through 2G, or other systems. From within the radio frequency neutralization radius, no new connections were successful, incoming or outgoing. When an active connection was within the radio frequency neutralization radius and the radio frequency inhibitor was activated with the actuator 114, any active connections with the simulated smartphone were terminated. Tests were also successfully performed on 5 different brands of garage door openers.

The bands mentioned above are selected for one explanatory embodiment because these bands represent frequencies used with most CONUS cellular networks, and also include the VHF/UHF band, which works to inhibit garage door openers and other short distance transmitters in this frequency band. The cellular standard frequencies referenced above represent the downlink frequencies from the base station to the cellular receiver. To prevent remote detonation of explosive devices using cellular devices, testing has shown that it is only necessary to inhibit frequencies within these bands. Of course, if additional bands are designated for use in a cellular context, they could be added as well. When downlink channels are inhibited, the cellular receiver will believe that there is no connection, and will thus be rendered neutralized by becoming ineffective to detonate explosive devices. Inhibiting the downlink frequencies is advantageous not only because it neutralizes cellular frequency detonation devices, but it also requires less power than does inhibiting the uplink channels. Accordingly, energy is conserved in the rechargeable battery 304, thereby leading to an increased run time.

Testing has shown that, to successfully inhibit a radio frequency signal, the receiver of the device being inhibited must receive a high level of noise compared to incoming communication signals that it is expecting. Testing has shown that when the one or more radio frequency inhibition signals 405 create a signal-to-noise ratio of one with the incoming communication signals, adequate inhibiting is achieved. Said differently, if the one or more radio frequency inhibition signals 405 are emitted from the antenna assembly 305 at the same power level as communication signals being received by a targeted device, the receiver of the targeted device will not be able to detect the incoming communication signals. Since the incoming communication signals to the receiver of the targeted device change as a function of the distance the targeted device is from a base station, which is the origin of the incoming communication signal, testing has shown that when the one or more radio frequency inhibition signals 405 are emitted form the antenna assembly 305 with an output power level of less than or equal to −85 decibel-milliwatts (dBm), successful inhibition of cellular devices within a radio frequency neutralization radius of the radio frequency inhibitor 400 can be achieved. At the same time, emission of the one or more radio frequency inhibition signals 405 at this power level reduces the length of the radio frequency neutralization radius to extend run time of the rechargeable battery 304 while providing an adequate radio frequency neutralization radius to render detected explosive devices un-detonatable.

In one or more embodiments, the antenna assembly 305 comprises a directional antenna to emit the radio frequency inhibition signals 405 as a lobed radio frequency inhibition signal output, as will be shown in more detail below with reference to FIGS. 11 and 13-15. By using a directional antenna, output power can be directed about a threat, rather than straight up in the air, thereby resulting in more efficient operation and longer battery life. In one or more embodiments tested during development, the radio frequency inhibitor 400 can remain in standby mode up to forty-eight hours, and offers an active transmit time of at least 150 minutes. In one or more embodiments, the rechargeable battery 304 is field and hot-swappable.

In one embodiment, an actuator 114 is operable with the control circuit 314. As described above, the actuator 114 can be integrated with a control device (102), which in one embodiment is a leash for a canine harness (101) that mechanically couples to the canine harness (101) and electrically couples to the radio frequency inhibitor 400. When the actuator 114 is actuated, this causes the radio frequency inhibitor 400 to emit the one or more radio frequency inhibition signals 405.

Which of the radio frequency circuits 306,307,308,309, 310,311,312,313 actuates upon actuation of the actuator 114 is user selectable in one or more embodiments. In other embodiments, the radio frequency inhibitor 400 is configured in a default configuration where all radio frequency circuits 306,307,308,309,310,311,312,313 actuate upon actuation of the actuator 114, which causes the one or more radio frequency inhibition signals 405 to essentially comprise white noise spanning a frequency range of about three hundred megahertz to about twenty-four hundred megahertz. Other configurations will be obvious to those of ordinary skill in the art having the benefit of this disclosure.

In one embodiment a functionality indicator 406 is operable with the control circuit 314. In one or more embodiments, the functionality indicator 406 can be integrated with the control device (102) along with the actuator 114. The functionality indicator 406 can deliver a radio frequency inhibitor functionality indication 407. The radio frequency inhibitor functionality indication 407 can comprise a light-based output, text-based output, audible output, or other output. A user can obtain an operational status indication from the functionality indicator 406 in one or more embodiments via the radio frequency inhibitor functionality indication 407.

For example, in one embodiment the functionality indicator 406 comprises a light source 408, such as a light emitting diode, which is capable of emitting different colors of light. Thus, in one embodiment the light source 408 is to emit a first color 409, such as green, when the radio frequency inhibitor 400 is fully operational and a second color 410, such as yellow or red, when the radio frequency inhibitor 400 is operationally impaired. Accordingly, a user may obtain a functionality status in real time. One example of a functionality indication 407 that may be of interest to a user is remaining battery capacity. In one embodiment, if the functionality indication 407 comprises a green light all equipment is working properly. A yellow light indicates low battery power in one or more embodiments. A red indicator light indicates system malfunction in one or more embodiments. Such a convention can be used before the system is employed and during employment to indicate that the radio frequency inhibitor (400) has been activated.

In one or more embodiments, the functionality indicator 406 and the actuator 114 can be combined into a single device. For example, the combined device may be a push button with an embedded light emitting diode. A user can press the push button for less than a first predetermined duration, such as less than a second, to obtain a functionality indication 407. The user can then press the push button for at least a second predetermined duration, such as more than a second and a half, to actuate the radio frequency inhibitor 400.

Other features can be configured into the actuator 114 as well. For example, embodiments of the disclosure contemplate that a user may want to lock the radio frequency inhibitor 400 in the on position. In one embodiment, the actuator 114 comprises a locking switch to selectively lock into either the ON or OFF position. In other embodiments, this locking function can be implemented using operational instructions in the control circuit 314. For example, a double tap or alternatively a press of the actuator 114 for at least a predetermined third duration, such as five seconds, may cause the control circuit 314 to lock the radio frequency circuits 306,307,308,309,310,311,312,313 in the ON position. Other techniques for locking the actuator 114 into the ON or OFF position will be obvious to those of ordinary skill in the art having the benefit of this disclosure.

Figure 5:
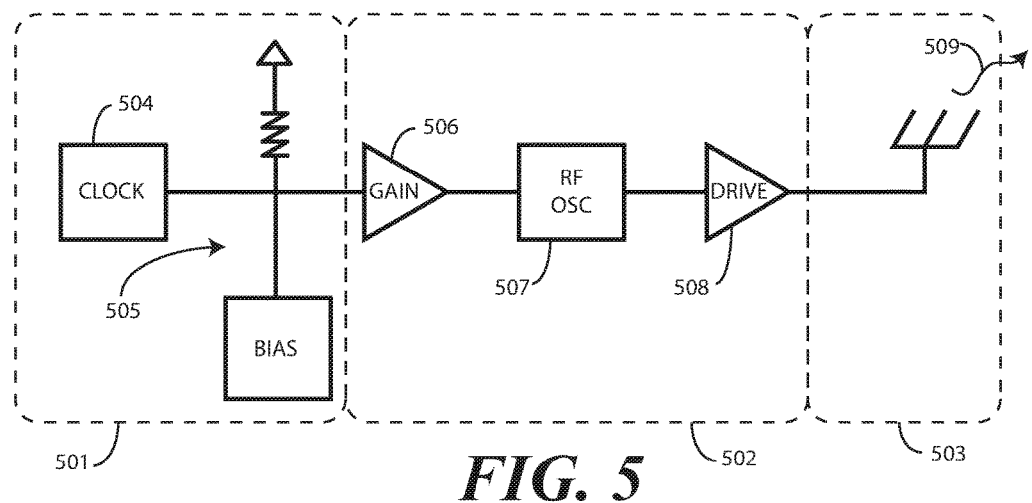
FIG. 5 illustrates one explanatory radio frequency inhibiting circuit in accordance with one or more embodiments of the disclosure.

Turning now to FIG. 5, illustrated therein is one explanatory schematic block diagram of a radio frequency circuit 404 in accordance with one or more embodiments of the disclosure. The basic elements of each radio frequency circuit 404 include a tuner 501, a radio frequency section 502, and an antenna 503. The radio frequency circuit 404 is powered by a power supply (402) and optionally a rechargeable battery (304) in one or more embodiments. The tuner 501 contains the voltage waveform plus noise needed for the radio frequency section 502 to produce a desired radio frequency signal. In one or more embodiments, the radio frequency section 502 includes both a voltage-controlled oscillator and an amplifier, which produce an inhibiting signal that is fed to the antenna 503.

In one embodiment, the tuner 501 is formed from a 555-timer or other clock circuit 504. A biasing circuit 505 then shifts levels of the clock output for delivery to an amplifier 506, which is a 7300-series operational amplifier in one or more embodiments. With gain applied, the amplified clock signal is delivered to a radio frequency oscillator 507, which in one embodiment is a voltage-controlled oscillator such as the ROS-2510-319+ voltage controlled oscillator manufactured by Mini Circuits. The output thereof is delivered to a drive circuit 508, which in one embodiment includes a low-noise/high gain radio frequency amplifier. The amplified radio frequency output is then delivered to the antenna 503.

In one or more embodiments, the output 509 from the antenna 503 has a limited inhibition range defined as a radio frequency neutralization radius. In one or more embodiments, the radio frequency neutralization radius is designed to be approximately three to five meters. In one or more embodiments, this limited distance is by design to ensure targeting and neutralization of suspected packages or personnel, but that has minimal impact on surrounding and unsuspecting bystanders. This limited neutralization range allows embodiments of the disclosure to be used covertly or in densely populated urban areas.

Figure 6:
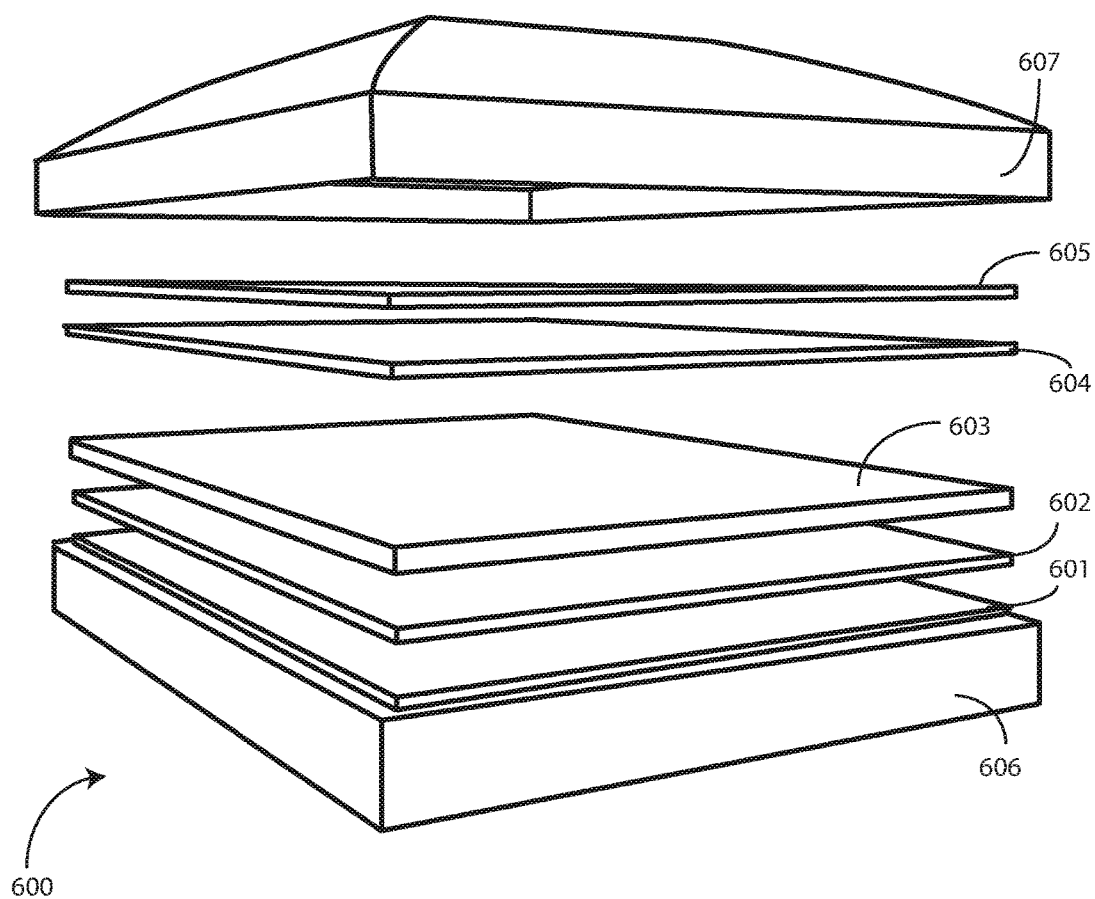
FIG. 6 illustrates another explanatory radio frequency inhibitor in accordance with one or more embodiments of the disclosure.

In one or more embodiments, the components of FIG. 4 can be placed on one or more printed circuit boards and stowed within a canine harness (101) to render the radio frequency inhibitor (400) operational. However, certain environments and applications may call for additional components as well. Turning now to FIG. 6, illustrated therein are some of these optional components.

FIG. 6 illustrates a mechanical stack-up of one explanatory radio frequency inhibitor 600 suitable for use with one or more embodiments of the disclosure. The various mechanical layers are interchangeable in FIG. 6. Accordingly, the various layers may be used in any combination. Subsets of the layers may be used. Alternatively, all the layers may be used. Additional layers suitable for use with the radio frequency inhibitor 600 will be obvious to those of ordinary skill in the art having the benefit of this disclosure as well.

In one embodiment, a radio frequency inhibitor 600 includes as many as five mechanical layers 601,602,603, 604,605. In one embodiment, the first layer 601 serves as a heat-blocking layer. This first layer 601 can be manufactured from fabric, synthetic polymers, or other materials to absorb, mitigate, or dissipate heat from external sources. For example, when the radio frequency inhibitor 600 is integrated into a canine harness (101), the first layer 601 can prevent heat generated by the canine from compromising the operational reliability of the radio frequency inhibitor 600. The first layer 601 can also prevent heat from the electronic components of the radio frequency inhibitor 600 from hurting the canine as well. Accordingly, the first layer 601 can be used to prevent thermal transfers between the electronic components and the canine's body.

The optional second layer 602 is a cooling synthetic layer in one or more embodiments. This second layer 602 can be manufactured from fabric, synthetic polymers, or other materials to provide a cool, printed circuit board friendly surface. The second layer 602 can be used to ensure the electronic components of the radio frequency inhibitor do not overheat during operation in hot environments.

In this illustrative embodiment, the third layer 603 comprises one or more printed circuit boards. This layer 603 can include the electrical components of FIG. 3, 4, or 5 that provide the radio frequency inhibitor 600 with its electronic countermeasure capabilities. In one embodiment, this layer 603 is equal in weight and material as any corresponding boards disposed on the other side of a canine harness (101) to minimize canine fatigue and to ensure physiological balance and weight distribution. In one embodiment, the design of this layer 603 is coupled to an antenna assembly (305) that may be disposed across the back of a canine as was shown in FIG. 3 above.

In one embodiment, the fourth layer 604 can be cooling synthetic layer that provides the same affects as the second layer 602. An optional fifth layer 605 can be included to absorb, mitigate, or dissipate environmental heat, functioning in the same way as the first layer 601. The design of this layer 605 can prevent environmental temperatures from being transferred to the printed circuit board of the third layer 603.

In one or more embodiments, the radio frequency inhibitor 600 can be placed within a housing 606,607 to prevent water, chemicals, or other materials from compromising operational performance. In other embodiments, the components of the radio frequency inhibitor 600 can be potted, rather than being placed in the housing 606,607, to provide the same protection. Other exterior coating, covering, and sealing techniques will be obvious to those of ordinary skill in the art having the benefit of this disclosure.

Figure 7:
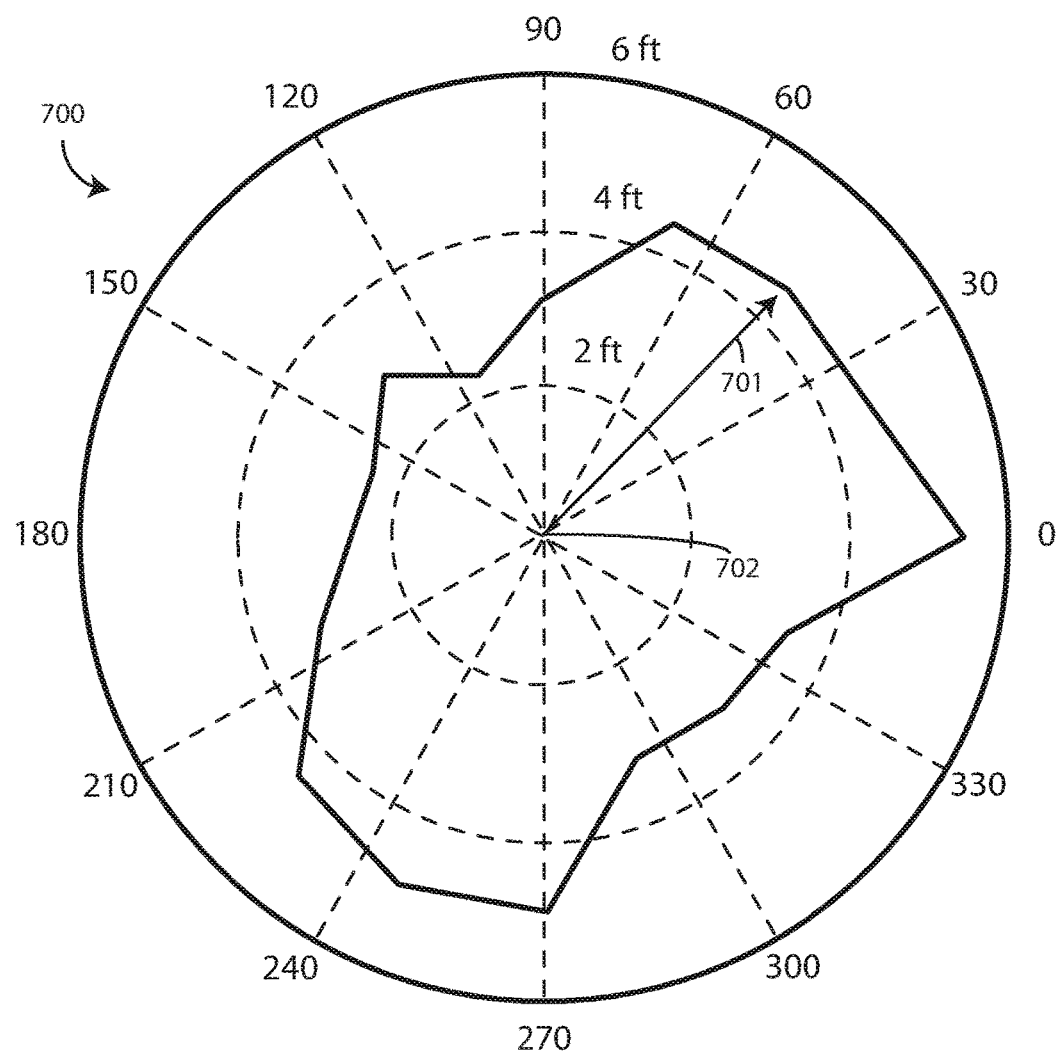
FIG. 7 illustrates an explanatory radar plot in accordance with one or more embodiments of the disclosure.

Turning now to FIG. 7, illustrated therein is a sample radar plot 700 showing illustrative performance of one radio frequency inhibitor tested during development. The radar plot 700 illustrates the radio frequency neutralization radius 701 about a radio frequency inhibitor (disposed at the center 702 of the radar plot 700) within which radio frequency devices are unable to receive radio frequency configurations. The illustrative radar plot 700 was taken using the radio frequency inhibitor (400) of FIG. 4 with an output power of about −85 dBm.

In this embodiment, the length of the radio frequency neutralization radius 701 was defined as the point at which radio frequency devices lose the ability to receive incoming communications. From within the "bubble" defined by the radio frequency neutralization radius 701, no new radio communications were connections were successful, be they incoming or outgoing. If an active connection was occurring within the bubble prior to radio frequency inhibitor actuation, the connection is lost and dropped.

Figure 8:
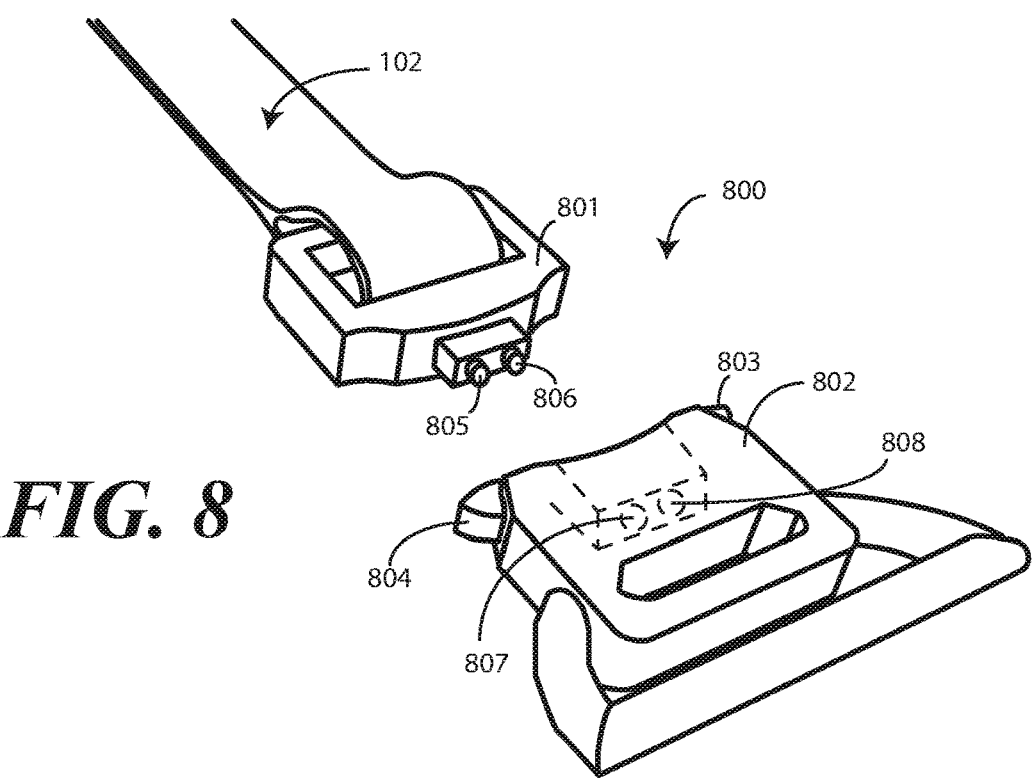
FIG. 8 illustrates one explanatory coupler in accordance with one or more embodiments of the disclosure.

Turning now to FIG. 8, illustrated therein is one example of a coupler 800 used to connect a control device 102, configured here as a leash, to a canine harness (101). As noted above, in one or more embodiments, the leash is to mechanically couple to the canine harness (101) while electrically coupling to a radio frequency inhibitor (400) disposed within the canine harness (101). This is the case when an actuator (114) and/or functionality indicator (406) is integrated with the control device 102. FIG. 8 illustrates one explanatory way to make this connection. Others will be readily apparent to those of ordinary skill in the art having the benefit of this disclosure.

The coupler 800 of FIG. 8 includes two connections: a mechanical connection and an electrical connection. The mechanical connection is made when the first portion 801 of a releasable buckle connects to a second portion 802 of the releasable buckle. The buckle is releasable by way of one or more release mechanisms 803,804 disposed on the second portion 802 of the buckle.

The first portion 801 of the releasable buckle in this embodiment includes one or more electrical contacts 805, 806, When the first portion 801 of the releasable buckle mechanically couples to the second portion 802 of the releasable buckle, the electrical contacts 805,806 engage complementary contacts 807,808 in the second portion 802 of the releasable buckle to provide a reliable electrical connection. Electrical conductors passing through each portion 801,802 of the releasable buckle can then connect the actuator (114) and/or functionality indicator (406) to the components of the radio frequency inhibitor (400).

It should be noted that in one or more embodiments, the radio frequency inhibitor (400) can be powered by a rechargeable battery (304). Where this is the case, i.e., where the radio frequency inhibitor (400) comprises a rechargeable power source, the rechargeable power source rechargeable via the one or more electrical contacts 807,808 in the second portion 802.

Figure 9:
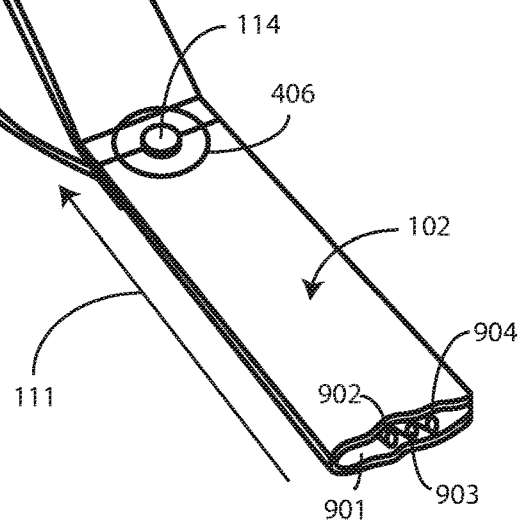
FIG. 9 illustrates one explanatory control device in accordance with one or more embodiments of the disclosure.

As shown in FIG. 9, in one embodiment the leash or other control device 102 defines a duct 901 traversing a length 111 of the leash. In one embodiment, one or more electrical conductors 902,903,904 are disposed within the duct 901 to connect the actuator 114 and/or functionality indicator 406 to the radio frequency inhibitor (400) to which the control device 102 is mechanically and/or electrically coupled to. For example, the one or more electrical conductors 902,903, 904 may connect to the electrical contacts (805,806) of the first portion (801) of a releasable buckle engaging complementary contacts in the second portion (802) of the releasable buckle as shown in FIG. 8 above.

Figure 10:
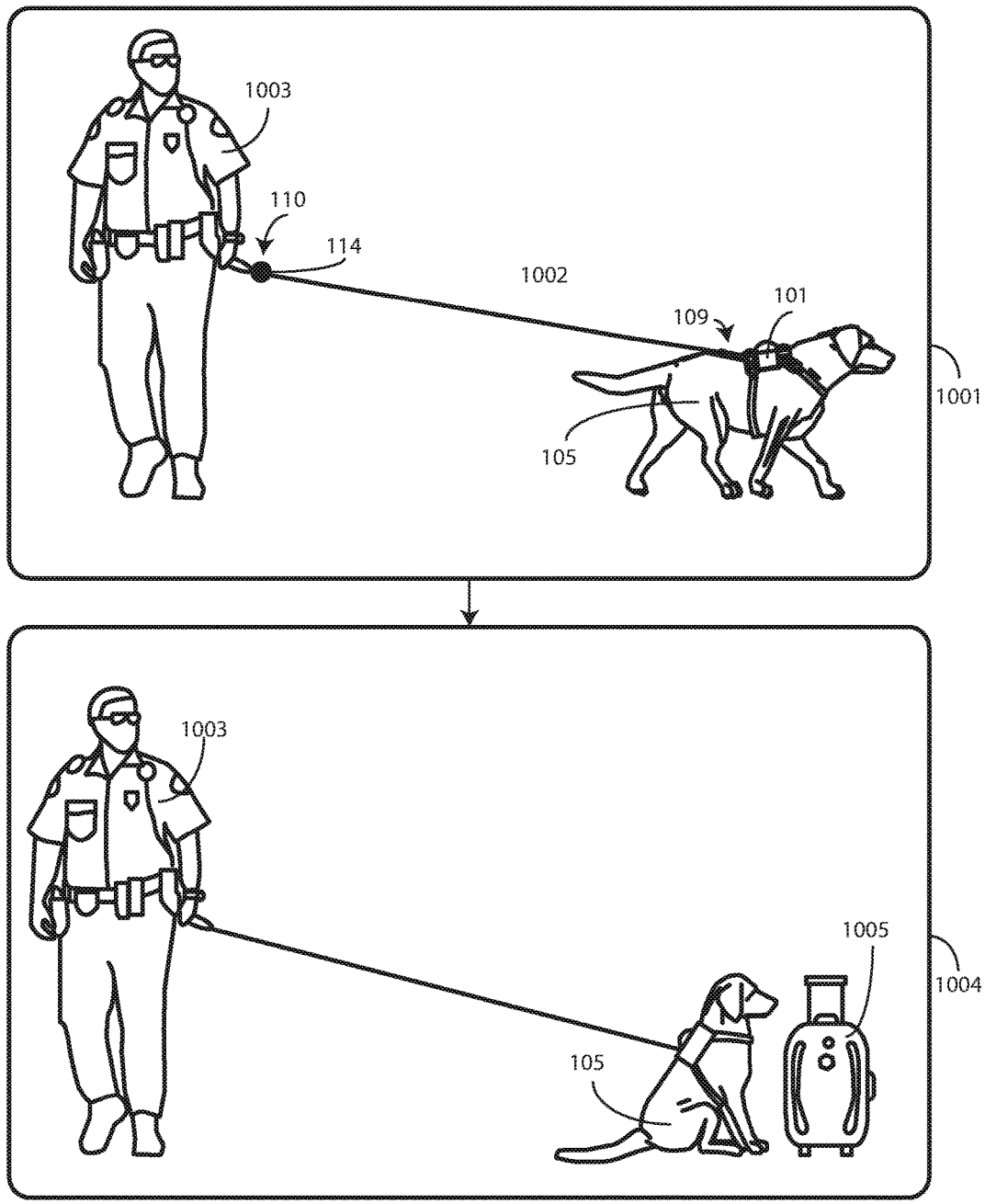
FIG. 10 illustrates steps of one explanatory method in accordance with one or more embodiments of the disclosure.
Figure 11:
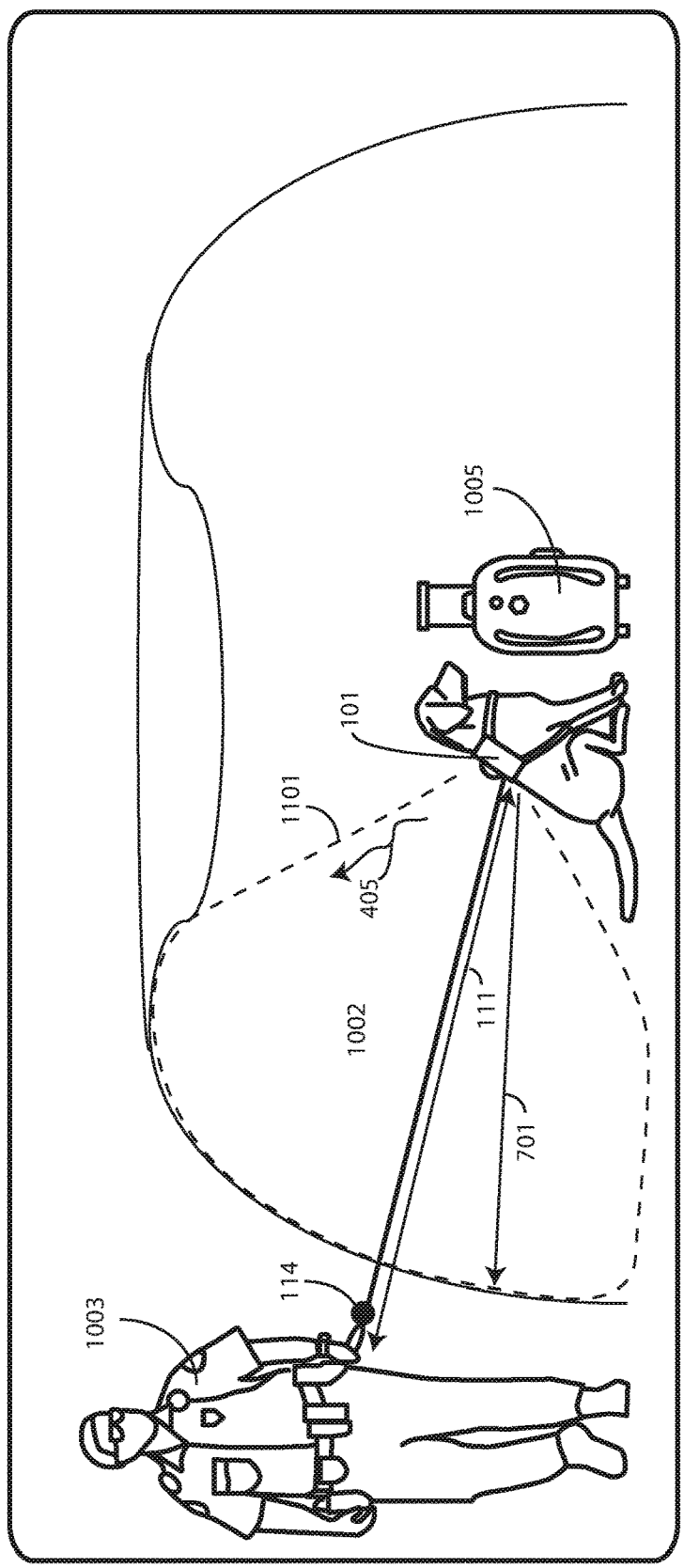
FIG. 11. Illustrates steps of one explanatory method in accordance with one or more embodiments of the disclosure.

Turning now to FIGS. 10-11, illustrated therein are explanatory steps of a method of using an explosive neutralization apparatus in accordance with one or more embodiments of the disclosure. Beginning with FIG. 10 at step 1001, the method provides a canine harness 101. In one embodiment, the canine harness 101 comprises a radio frequency inhibitor (400) and is electrically coupled to the first end 109 of a leash 1002. The leash 1002 comprises a first end 109 and a second end 110 located distally from the first end 109. The first end 109 of the leash 1002 is selectively attachable to the canine harness 101 in this embodiment.

In this illustrative embodiment, the leash 1002 includes an actuator 114 for actuating the radio frequency inhibitor (400). The actuator 114 is disposed at a second end 110 of the leash 1002. The canine harness 101 is attached to a canine 105. The actuator 114 is electrically coupled to the radio frequency inhibitor (400) when the first end 109 of the leash 1002 is attached to the canine harness 101. The actuator 114 is to cause the radio frequency inhibitor (400) to emit one or more radio frequency inhibition signals (405) upon actuation. In one embodiment, the actuator 114 is to cause the radio frequency inhibitor (400) to emit all programmed radio frequency inhibition signals. For example, the actuator 114 can cause all operable radio frequency circuits (306,307,308,309,310,311,312,313) to actuate, which causes the one or more radio frequency inhibition signals (405) to essentially comprise white noise spanning all programmed frequencies. In one embodiment, this results in the white noise having a frequency range of about three hundred megahertz to about twenty-four hundred megahertz.

At step 1001, the canine harness 101 and radio frequency inhibitor (400) form a compact and lightweight design. For example, testing demonstrates that the combination can weigh as little as fourteen ounces without the leash 1002. Moreover, the design of the radio frequency inhibitor (400) is not readily noticeable in the canine harness 101 so that it appears to be an ordinary dog vest. Providing the actuator 114 in the leash 1002 allows the handler 1003 to have the ability to immediately activate the radio frequency inhibitor (400) the canine 105 signals that it has found a threat. When a functionality indicator (406) is also included in the leash 1002, the handler 1003 also has the ability to run a system check, which will make sure the radio frequency inhibitor is functioning properly. In one or more embodiments, testing has shown that the radio frequency inhibitor (400) has an operation time, i.e., when emitting radio frequency inhibition signals (405) of two hours and thirty minutes with a fully charged rechargeable battery (304).

At step 1004, the canine 105 has detected a suitcase 1005 that likely contains an improvised explosive device that can be detonated with a remote radio frequency device such as a garage door opener or a cellular phone. The canine 105 signals this by sitting down. The handler 1003 is therefore immediately notified of the threat.

Acting instantly, turning now to FIG. 11, the handler 1003 actuates the actuator 114. Accordingly, the handler 1003 actuates the actuator 114 to cause the radio frequency inhibitor (400) to emit one or more radio frequency inhibition signals 405. In this illustrative embodiment, the radio frequency inhibitor (400) comprises a directional antenna to emit the radio frequency inhibition signals 405 as a lobed radio frequency inhibition signal output 1101 about the canine harness 101, thereby rendering the explosive device stowed within the suitcase 1005 inoperable.

In one embodiment, the lobed radio frequency inhibition signal output 1101 defines a radio frequency neutralization radius 701 within which radio frequency controlled devices operating at frequencies of between about three hundred megahertz and about twenty-four hundred megahertz are inoperative. In one embodiment, this radio frequency neutralization radius 701 is less than a length 111 of the leash 1002. Thus, if the leash 1002 has a length 111 of about ten feet, in one embodiment the radio frequency neutralization radius 701 is less than about ten feet. Advantageously, this allows the handler 1003 to use radio communication to call for backup, while keeping the explosive threat neutralized. Thus, in one or more embodiments the one or more radio frequency circuits (306,307,308,309,310,311,312,313) of the radio frequency inhibitor (400) are to emit the radio frequency inhibition signals 405 at a predetermined output power for at least a predetermined distance, where the predetermined distance less than a length of the leash 1002.

As shown in FIGS. 10-11, embodiments of the disclosure provide explosive neutralization for the handler 1003 and canine 105 operating in environments vulnerable or susceptible to bomb threats and suspected explosive activities. As shown in these figures, the system can remain in an effective standby mode until the canine 105 alerts upon suspected explosive materials. The handler 1003 then activates the radio frequency inhibitor (400), thereby mitigating/preventing potential detonations by providing critical time to clear the threat area of bystanders.

In one or more embodiments, the radio frequency inhibitor (400) provides a multifrequency and multi-band signal inhibitor fully integrated into a canine harness 101, with the leash 1002 serving as a control device (102). Advantageously, the design is lightweight and maintains the appearance of an ordinary working dog harness. The actuator 114 can be located on the leash, which can then be hardwired to the radio frequency inhibitor (400) through a ruggedized mechanical connection, and controlled by the handler 1003. In one or more embodiments, the handler 1003 also has the ability to initiate a functions check from the leash 1002 via a functionality indicator (406) to ensure the system is operating properly. In one or more embodiments, the handler 1003 can immediately activate the countermeasure when the canine 105 reacts/identifies an explosive material or device. The tactical benefits of this system include the ability to covertly mitigate the detonation of explosive devices that are remotely initiated by radio frequency. It should be noted that in one or more embodiments, the device can work "off-leash" via an actuator operable with the power supply (402).

In one or more embodiments, it can be desirable to quickly remove the canine harness 101 from the canine 105 so that it can be left behind to neutralize the explosive while the canine 105 is ushered to safety. To provide increased functionality in this regard, in one embodiment the coupler between the canine harness 101 and the attachment devices (103,104) can include a quick release mechanism. Turning now to FIGS. 12-14, illustrated therein is one such quick release mechanism.

Beginning with FIG. 12, the coupler 1200 between the attachment device 103 used to attach the canine harness 101 to a canine (105) includes a first portion 1201 that is coupled to the attachment device 103 and a second portion 1202 that is coupled to the canine harness 101. The first portion 1201 is to engage the second portion 1202 when the attachment device 103 is wrapped about the canine (105) to attach the canine harness 101 thereto.

Figure 15:
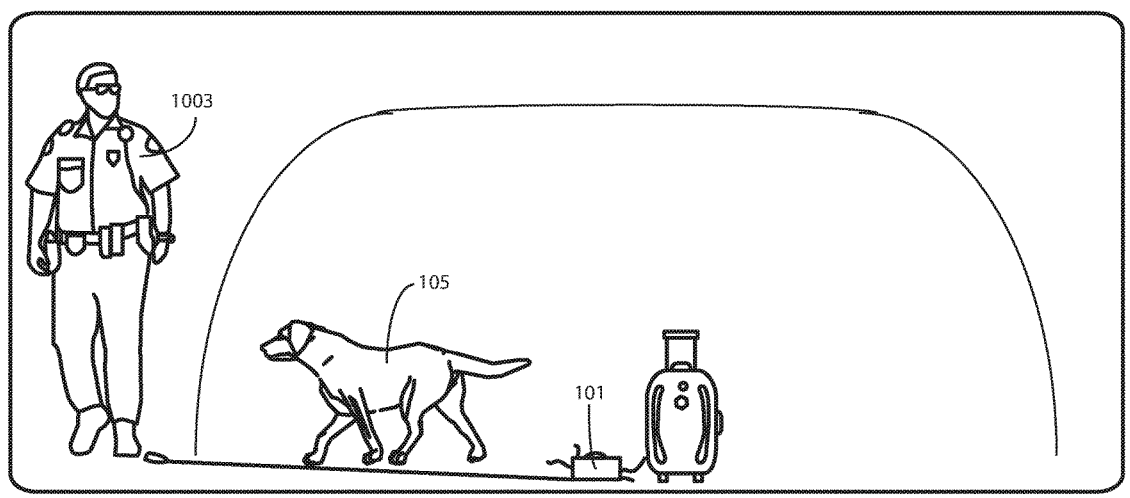
FIGS. 15-17 illustrate steps of one or more explanatory methods in accordance with one or more embodiments of the disclosure.

A clasp 1203 retains the first portion 1201 engaged to the second portion 1202. The clasp 1203 is held in the closed position by a retaining pin 1204. The retaining pin 1204 of this embodiment is coupled to a ripcord 1205 that passes through the duct (901) traversing a length (111) of the leash (1002). As shown in FIG. 13, the handler (1003) can pull 1301 the ripcord 1205 from the second end (110) of the leash (1002) to release the pin 1204. The clasp 1203 is then released and pivots 1302 about a hinge 1303 to free the first portion 1201 from the second portion 1202. As shown in FIG. 14, the first portion 1201 thus releases from the second portion 1202. This allows the canine harness 101 to be quickly released from the canine (105) from the second end (110) of a leash (1002). As shown in FIG. 15, the handler 1003 has used the quick release mechanism to release the canine harness 101 from the canine 105 so that the canine 105 can seek safety.

Figure 16:
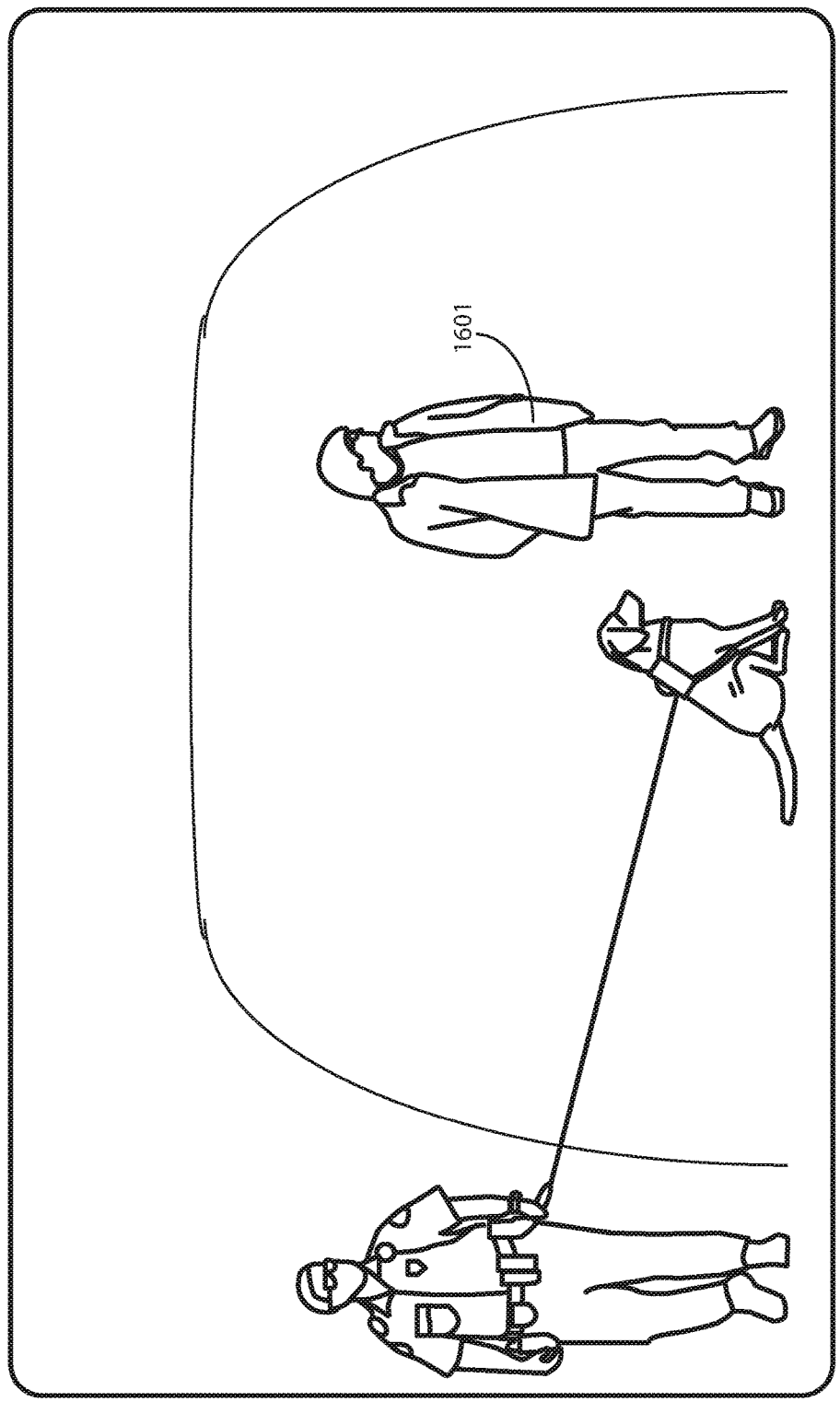
Figure 17:
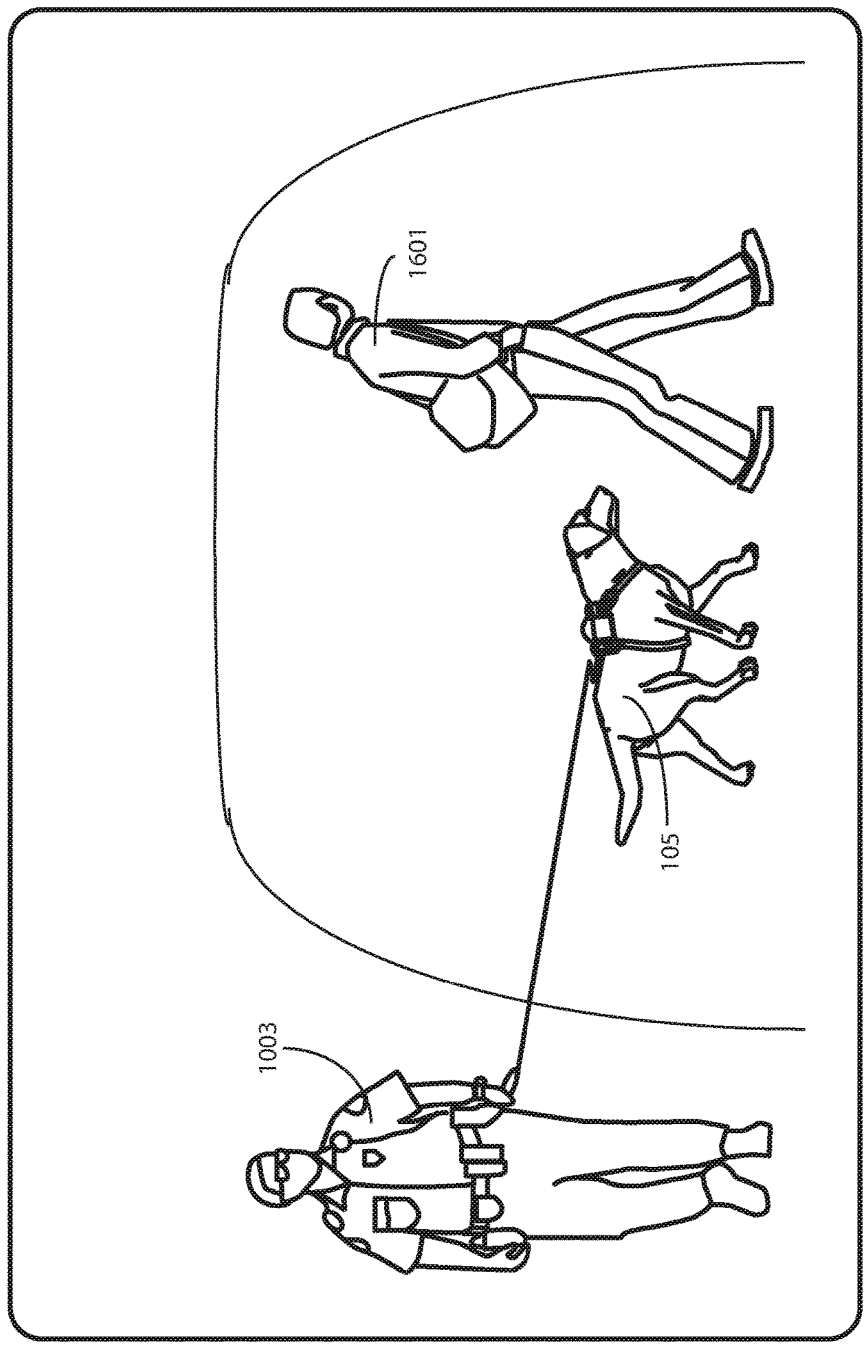

Embodiments of the disclosure can be used to neutralize mobile threats, stationary threats, explosives that are hidden, and explosives that are body worn. Illustrating by example, in FIG. 16, the system is being used to neutralize a suspect 1601 with a body worn explosive device. As shown in FIG. 17, when that suspect 1601 moves, the system remains effective due to the mobility of the canine 105 and the handler 1003.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Figure 18:
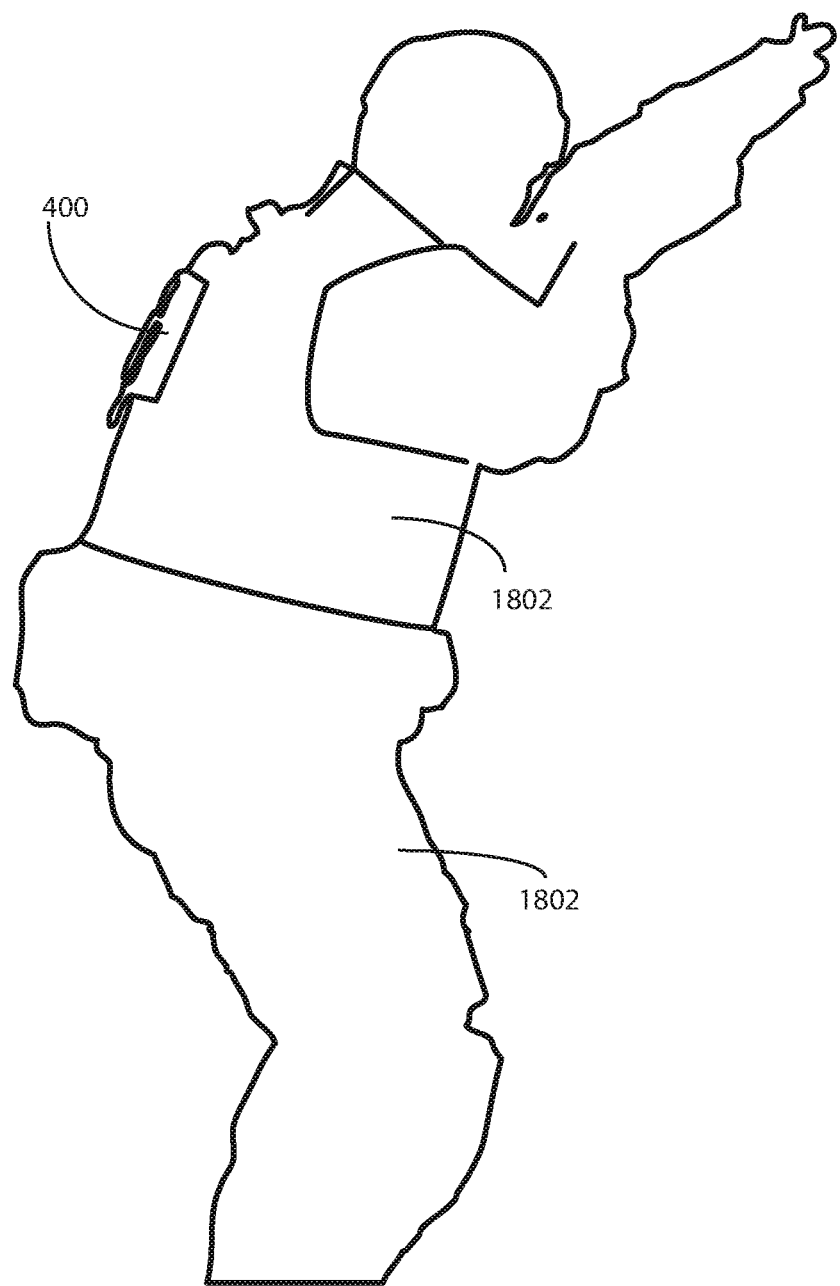
FIGS. 18-19 illustrate alternate embodiments of systems in accordance with one or more embodiments of the disclosure.
Figure 19:
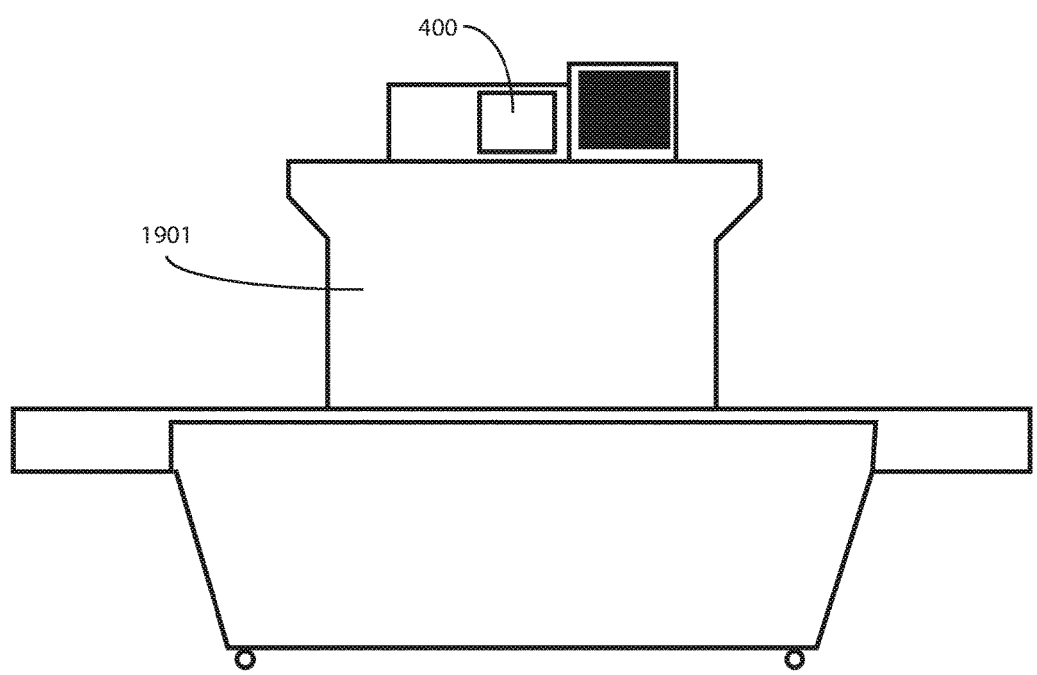

For example, while a principle embodiment of the disclosure integrated the radio frequency inhibitor (400) into a canine harness (101), the radio frequency inhibitor (400) could be integrated into clothing as well. As shown in FIG. 18, a soldier 1801 can integrate a radio frequency inhibitor 400 into tactical clothing or armor 1802 to preclude explosive detonations within a predefined radio frequency neutralization radius. Similarly, as shown in FIG. 19, a radio frequency inhibitor 400 can be integrated into equipment 1901, such as an x-ray machine, to preclude that equipment from being disabled by an explosive device. Other applications of embodiments of the disclosure will be obvious to those of ordinary skill in the art having the benefit of this disclosure.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An apparatus, comprising:
 a canine harness comprising a radio frequency inhibitor; and
 a leash, mechanically coupled to the canine harness and electrically coupled to the radio frequency inhibitor, the leash comprising a first actuator to cause the radio frequency inhibitor to emit one or more radio frequency inhibition signals upon actuation;
 the leash further comprising a quick release mechanism at a first end of the leash and a second actuator at a second end of the leash, the quick release mechanism releasing the canine harness from a canine in response to actuation of the second actuator.

2. The apparatus of claim 1, the radio frequency inhibitor comprising a directional antenna to emit the one or more radio frequency inhibition signals as a lobed radio frequency inhibition signal output about the canine harness.

3. The apparatus of claim 2, the lobed radio frequency inhibition signal output having an output power less than or equal to minus eighty-five decibel-milliwatts.

4. The apparatus of claim 1, the leash further comprising a functionality indicator electrically coupled to the radio frequency inhibitor, the functionality indicator to deliver a radio frequency inhibitor functionality indication.

5. The apparatus of claim 1, the canine harness comprising one or more attachment devices to attach the canine harness to the canine, wherein the second actuator is operable from the second end of the leash to open the quick release mechanism, thereby selectively releasing the canine harness from the canine.

6. A device, comprising:
 a canine harness;
 a radio frequency inhibitor disposed within the canine harness; and
 a leash comprising a first end and a second end located distally from the first end;
 the first end selectively attachable to the canine harness;
 the second end comprising:
  a first actuator electrically coupled to the radio frequency inhibitor when the first end is attached to the canine harness, actuation of the first actuator causing the radio frequency inhibitor to emit one or more radio frequency inhibition signals upon actuation; and
  a second actuator at the second end, operable with a quick release mechanism, that, upon actuation of the second actuator, releases the canine harness from a canine.

7. The device of claim 6, the second end further comprising a functionality indictor comprising a light source to emit a first color when the radio frequency inhibitor is fully operational and a second color when the radio frequency inhibitor is operationally impaired.

8. The device of claim 6, the radio frequency inhibitor comprising:
 a control circuit;
 one or more radio frequency circuits operating within one or more frequency bands and operable with the control circuit; and
 an antenna operable with the one or more radio frequency circuits.

9. The device of claim 8, the one or more frequency bands comprising one or more of:
 a first band of about three hundred megahertz to about five hundred megahertz;
 a second band of about seven hundred twenty-five megahertz to about seven hundred eighty-five megahertz;
 a third band of about eight hundred fifty megahertz to about nine hundred megahertz; or
 a fourth band of about nine hundred twenty-five megahertz to about nine hundred sixty megahertz.

10. The device of claim 8, the one or more frequency bands comprising one or more of:
 a first band of about eighteen hundred megahertz to about eighteen hundred eighty megahertz;
 a second band of about nineteen hundred thirty megahertz to about nineteen hundred ninety megahertz;
 a third band of about twenty-one hundred megahertz to about twenty-one hundred eighty-five megahertz; or
 a fourth band of about twenty-three hundred twenty-five megahertz to about twenty-four hundred megahertz.

11. The device of claim 10, the one or more radio frequency circuits to emit the one or more radio frequency inhibition signals at a predetermined output power for at least a predetermined distance less than or equal to ten feet.

12. The device of claim 8, the antenna comprising a flexible film antenna.

13. The device of claim 6, the leash defining a duct traversing a length of the leash, further comprising an electrical conductor disposed within the duct to connect the first actuator to the radio frequency inhibitor.

14. The device of claim 6, further comprising a coupler to couple the leash to the canine harness, the coupler comprising one or more electrical contacts to couple the first actuator to the radio frequency inhibitor.

15. The device of claim 14, the radio frequency inhibitor comprising a rechargeable power source, the rechargeable power source rechargeable via the one or more electrical contacts.

16. A method of using an explosive neutralization apparatus, the method comprising:
 providing a canine harness comprising a radio frequency inhibitor electrically coupled to a first end of a leash comprising a first actuator disposed at a second end;

causing the radio frequency inhibitor to emit one or more radio frequency inhibition signals by actuating the first actuator; and actuating a second actuator disposed at the second end to release the canine harness from a canine.

17. The method of claim 16, further comprising attaching the canine harness to the canine.

18. The method of claim 16, the one or more radio frequency inhibition signals comprising white noise spanning a frequency range of about three hundred megahertz to about twenty-four hundred megahertz.

\* \* \* \* \*